June 7, 1960 G. J. PARKS 2,939,956
METHOD AND APPARATUS FOR TREATING PLASTIC MATERIALS
Filed June 2, 1958
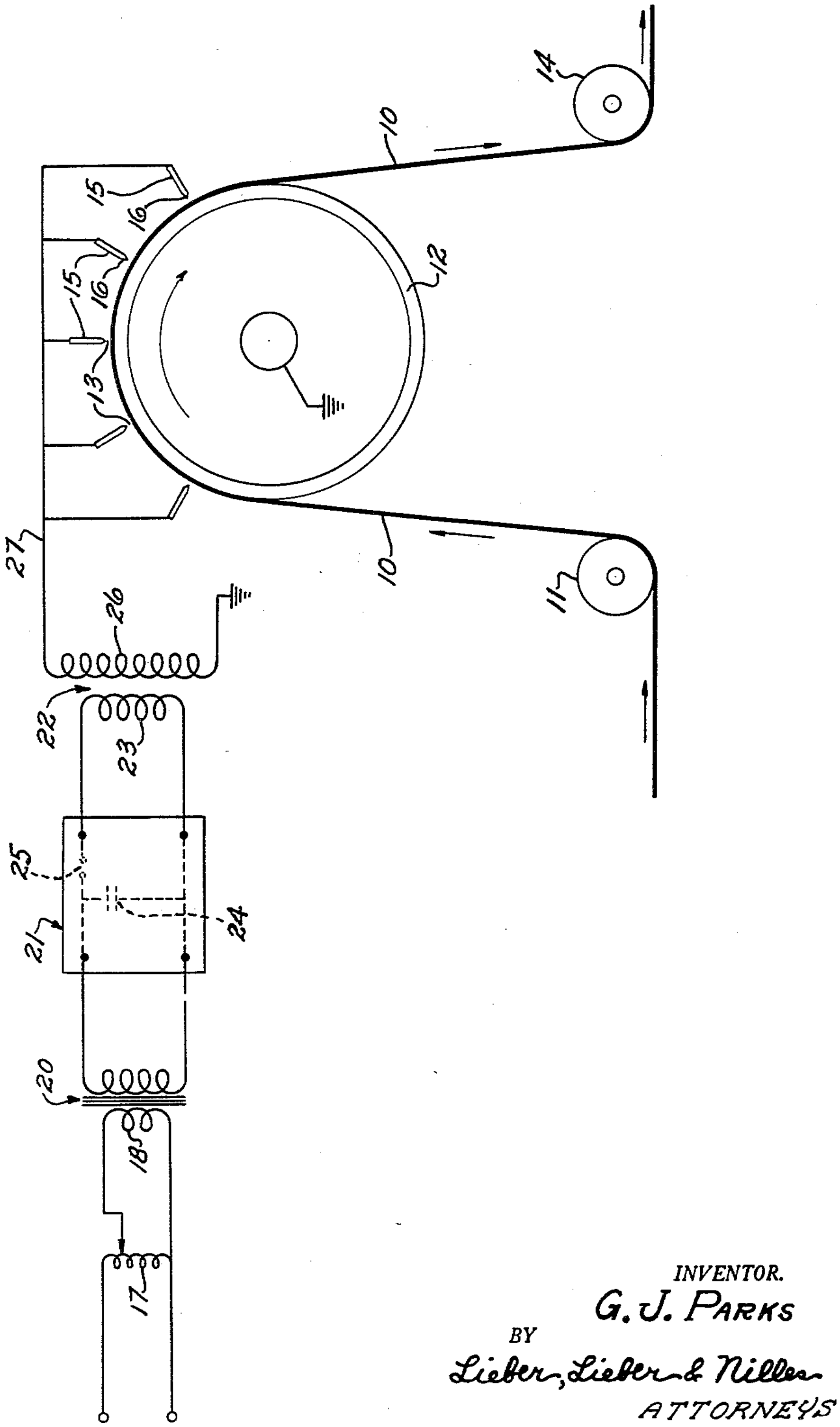
INVENTOR.
G. J. PARKS
BY
Lieber, Lieber & Nilles
ATTORNEYS United States Patent Office 2,939,956

Patented June 7, 1960

2,939,956

METHOD AND APPARATUS FOR TREATING PLASTIC MATERIALS

George J. Parks, Menomonee Falls, Wis., assignor to Milprint, Inc., Milwaukee, Wis., a corporation of Delaware Filed June 2, 1958, Ser. No. 739,103

7 Claims. (Cl. 250—49.5)

This invention relates to the treatment of plastic bodies to improve the receptivity thereof to adhesives such as ink subsequently imprinted thereon.

A film of a plastic such as polyethylene is ideal for such purposes as packaging and wrapping commodities, but it cannot normally be satisfactorily imprinted with trademarks and advertising material by the usual printing processes without special treatment.

Improved adhesion of printing inks to polyethylene film has been accomplished by exposing one surface of the film to high temperature while simultaneously cooling the opposite surface and also by passing the film through the zone of high voltage electric stress produced by ionizing the gap between a pair of spaced apart stationary electrodes or a stationary electrode and a rotatable metal roll or drum.

One of the electrodes in such apparatus for treating plastic film may be a relatively expensive rotatable metallic drum which may be damaged by erosion due to arcing if the high voltage electrical discharge short circuits to the metallic drum electrode. In order to prevent arcing directly over the metallic drum and resultant damage thereto, one or both of the electrodes of prior art devices is covered with a thin dielectric material to space the plastic film from the electrode, and films of various plastics are often utilized as the dielectric.

The voltage breakdown strength of such dielectric materials deteriorates rapidly when repeatedly exposed to the high voltage stresses and ozone in the ionizing gap, and the dielectric material soon punctures and must be replaced thus resulting in frequent shutdowns and delays.

Further, the resulting chemical changes in the treated surface of the plastic film and the properties of the plastic may vary considerably when the dielectric material deteriorates during production runs, and such variation introduces manufacturing difficulties in the treatment of the plastic film at production speeds.

In addition, the high voltages and relatively high power rating of prior art ionizing gap structures involves considerable danger to operating personnel.

It is an object of the invention to provide a method and apparatus for treating plastic bodies to improve the receptivity thereof to adhesives which obviates the need for a dielectric material covering either of the electrodes.

It is a further object of the invention to provide a method and apparatus for improving the adhesion of surfaces of plastic film to adhesives which involves no hazard to the safety of operating personnel.

The objects of the invention are accomplished, in general, by subjecting the plastic under treatment to an alternating, radio frequency electric field having an electric intensity greater than the disruptive dielectric strength of the air in the ionizing gap. By transforming the power to low current by means of a high voltage transformer whereby the current is reduced as the high voltage is increased (Ohm's law), the relatively low magnitude of electrical current used herein can be taken into the human body without harm and cannot burn or erode the metallic drum electrode.

These and other objects and advantages of the invention will be apparent from the following detailed description when taken in conjunction with the accompanying schematic diagram of a preferred embodiment of the invention.

Referring to the drawing, a film 10 of a plastic such as polyethylene in the process of being extruded or being unwound from a suitable supply roll (not shown) passes sequentially over an idler roller 11, a rotatable metallic drum electrode 12, through an ionizing gap indicated generally at 13, and over an idler roller 14 before being wound on a take-up reel (not shown). The take-up reel or the drum electrode 12 or both may be positively driven with means such as a torque motor drive being utilized to provide constant peripheral speed and constant speed of travel of the plastic film 10. The means for driving the take-up reel to maintain constant speed of travel of plastic film 10 and so that the film 10 will be taut, but not subjected to undue tension, are well known, and since the specific details thereof form no part of the invention, no further description thereof will be given.

One or more high voltage metallic electrodes 15 are disposed in circumferentially spaced apart relation around a portion of the periphery of metallic drum electrode 12, and while a single stationary electrode will treat film, the degree and speed of treatment will increase with the number of electrodes and the charge placed thereon. The electrodes 15 are spaced sufficiently from drum electrode 12 in a radial direction to permit passage of the plastic film 10 therebetween and to provide an air gap of desired dimensions between the plastic film 10 and the electrodes 15 which may be ionized by the application of sufficiently high voltage between the metallic drum 12 and the electrodes 15. Preferably the drum electrode 12 is grounded. The electrodes 15 are of any electrically conductive material not affected by nitrous acid which is produced by associated corona at critical levels of humidity and have a width compatible with that of plastic film 10 in a direction transverse of the direction of travel of plastic film 10 although in some cases it is desirable that the electrodes 15 be of less width than the film to eliminate concentration of sparking on the drum 12 beyond the edges of the film. Further, a sharp edge 16 on the end of each electrode 15 adjacent drum electrode 12 is conducive to the creation of maximum electrical sparking, thereby increasing the effectiveness of the treatment of the plastic film 10. Each electrode 15 is preferably adjustable to permit setting the air gap between film 10 and said electrode to the desired dimension.

An alternating, radio frequency, electric field of force having an electric intensity greater than the disruptive dielectric strength of air is provided in the ionizing gap 13 by applying the output from a suitable radio frequency generating source between electrodes 15 and drum electrode 12. The disruptive electric intensity at which air fails or breaks down is approximately 30 kilovolts per centimeter. At electric intensities of this magnitude, the free electrons in the air are accelerated to such high velocities that upon colliding with neutral molecular or atomic structures, electrons are torn away until the supply of free electrons forms a conducting path through the air indicated by the formation of a corona discharge and the evolution of ozone.

The high radio frequency electric stress accompanied by corona discharge and formation of ozone in the air produces chemical changes in the surface of the plastic film 10 which improves the receptivity thereof to adhesives, printing inks and decorative materials subsequently imprinted on the plastic film 10. The molecules of the polyethylene plastic are relatively saturated, and chemical changes are apparently effected in the surface of the plastic which increase the unsaturated linkages in the polyethylene surface molecules. These unsaturated linkages may then be oxidized by the ozone with the formation of polar groups such as peroxides, oxides and carbonyl groups.

In the preferred embodiment illustrated in the drawing, a suitable, sixty cycle, alternating current power source energizes the winding of an adjustable autotransformer 17, and the output of autotransformer 17 is impressed upon the primary winding 18 of a step-up transformer 20 having a high ratio of transformation to step up a low voltage source to a high potential preferably above 10,000 volts. The secondary of the step-up transformer 20 is coupled to a frequency changer 21 for converting the sixty cycle input into high voltage, low current radio frequency energy. The high potential, radio frequency output from frequency converter 21 impressed upon the primary 23 of a high voltage, radio frequency air core transformer 22 such as a Tesla coil having a large ratio of transformation. In the preferred embodiment illustrated in the drawing, the frequency converter 21 is shown in dotted lines as being of the spark gap oscillator type for delivering radio frequency energy to the primary winding of the Tesla coil 22. In this well known apparatus for generating radio frequency energy, a condenser 24 is charged to a sufficiently high potential to break down a spark gap 25 and permit an oscillatory discharge through the Tesla coil primary 23 which is repeated many times each second, thus generating a series of wave trains each of which is a damped sinusoidal oscillation. The distributed capacity between electrodes 15 and metallic drum electrode 12, with plastic film 10 therebetween, forms a resonant tuned circuit with the inductive reactance of Tesla coil secondary winding 26. The high frequency alternating current in the primary 23 of the Tesla coil 22 produces very rapidly reversing lines of electrical force. Consequently the secondary winding 26 is cut very rapidly by the changing lines of electrical force and a high voltage is induced therein. Satisfactory treatment of a surface of the plastic film to improve the receptivity to adhesives such as printing inks is obtained when the output from frequency converter 21 impressed upon the primary winding 23 of air core resonance transformer 22 is approximately ten thousand volts having a frequency of approximately two megacycles. The large turns ratio of radio frequency air core transformer 22 induces in the secondary 26 extremely high voltages, e.g., in the range of one million volts, which is impressed on electrodes 15 over conductor 27. The radio frequency voltage between electrodes 15 and the grounded metallic drum 12 is sufficient to raise the potential gradient in gap 13 above the disruptive electric intensity of the air in gap 13, which results in electrical breakdown of the air indicated by corona discharge and the evolution of appreciable amounts of ozone. Exactly how the high, radio frequency, electric field of force accompanied by corona discharge and production of ozone effects chemical changes in the surface of the plastic material to improve the receptivity thereof to printing inks and other adhesives is not entirely understood, but apparently the electrical sparking, with associated generated heat, and corona resulting from the high electrical charge, contacts the surface of the plastic film 10 and effects such chemical changes in the surface of the plastic which increase the unsaturated linkages in the surface molecules. These unsaturated linkages may then be oxidized by the ozone with the formation of polar groups such as peroxides, oxides and carbonyl groups to render the surface more receptive to printing inks and other adhesives, the improved adhesiveness apparently resulting from the polar groups formed by oxidation at the points of unsaturation. It is also noted that the treatment apparently results in removal of hydrogen from the carbon atoms along the chain and in the formation of double carbon-to-carbon bonds.

Although the preferred embodiment has been illustrated and described as including a radio frequency generator of the spark gap oscillator type, the invention is not so limited, and other high voltage, radio frequency generators such as vacuum tube oscillators of the Hartley, Colpitts, or push-pull type, preferably with air core resonance transformer coupling between the load circuit and the anode tank circuit of the generator tube, are suitable for producing a radio frequency electric field having a sufficiently high potential gradient between electrodes 15 and metallic drum electrode 12 to break down the air in the ionizing gap 13.

The high frequency currents obtained in the present instance are in the magnitude of .050 to .100 ampere, and are therefore, harmless to equipment and personnel even at the high voltages required to effect treatment of the plastic film by ionizing the electrode air gap.

Because of the high frequency and low current characteristics of the alternating field of electric force, no damage or erosion of the metallic drum electrode 12 occurs even if openings are present in the plastic film 10 which permit the electric discharge to occur directly to the surface of the metallic drum electrode 12. Further, the ability of the high frequency electricity to pass through the human body without causing any uncomfortable sensation makes the equipment entirely safe for personnel to operate.

The chemical change of the surface of the plastic film 10 resulting from the high electric intensity and accompanying corona discharge and ozone generation does not impair the heat-sealing properties of the plastic. Further exposure of the surface of the plastic to a radio frequency alternating field having sufficiently high potential gradient to break down the air does not deleteriously affect such desirable properties of the plastic as chemical inertness, waterproofness, strength, and transparency. The receptivity of the treated surface to adhesives is so improved that inks, which cannot be imprinted upon the plastic film before treatment, adhere tenaciously to the treated surface. The improved receptivity to adhesives is not necessarily limited to inks or any specific class of inks, nor is the disclosed method and apparatus limited to the treatment of any specific splastic to improve the receptivity of a surface thereof to adhesives. However, in actual practice, the invention has been successfully employed in the treatment of polyethylene to render the same receptive to polyamid as well as nitrocellulose and shellac type inks.

The invention provides an economical and simple method and apparatus for treating plastic bodies, to improve the adhesion of a surface thereof to adhesives, which personnel may operate in absolute safety. Also, the invention eliminates the need of dielectric material which in prior art devices was necessary to space the film from the electrode and prevent damage to the electrode, and such dielectric in prior art devices often required replacement and frequently deteriorated during production runs with the result that the chemical changes and the properties of the treated surface of the plastic undesirably varied. The elimination of the dielectric simplifies the construction of the plastic treating apparatus and results in substantial havings in cost and loss of production time.

While only a single embodiment of this apparatus and a single manner of practicing the invention have been illustrated and described, many modifications and variations thereof will be obvious to those skilled in the art, and consequently it is intended in the appended claims to cover all such modifications and variations as fall within the true spirit and scope of the invention.

What I claim as new and desire to secure by Letters Patent of the United States is:

1. Apparatus for treating a non-conductive plastic body to improve the receptivity of a surface thereof to adhesives, comprising a pair of spaced apart electrode means providing an ionizing air gap therebetween, high voltage radio frequency generating means connected across said electrode means for producing sufficiently high electric intensity in said gap to break down the air in said gap, and means for moving said plastic body through said gap between said electrode means.

2. Apparatus for treating non-conductive plastic film to improve the receptivity thereof to adhesives such as printing inks, comprising a pair of metallic electrode means disposed in spaced relationship to provide an air gap therebetween, means to move a non-conductive plastic film through said gap, and radio frequency generating means having the output thereof impressed across said electrode means for producing a field of electric force in said gap having a potential gradient greater than the dielectric strength of the air in said gap.

3. Apparatus for treating non-conductive plastic film to improve the receptivity thereof to adhesives such as printing inks, comprising a non-insulated grounded metallic drum electrode, electrode means spaced radially from said drum electrode and cooperating therewith to provide an ionizing gap therebetween, means to move said plastic film over said drum and through said gap, and means including an air core resonance transformer having the secondary thereof connected across said gap for producing an alternating radio frequency electric field in said gap having an electric intensity above the disruptive electric intensity of the air in said gap.

4. Apparatus for treating non-conductive plastic film to improve the adhesion thereof to ink subsequently imprinted thereon, comprising a pair of electrode means disposed in spaced relation to provide an air gap therebetween, one of said electrode means being a non-insulated grounded metallic drum, the other of said electrode means comprising a plurality of circumferentially spaced apart metallic electrodes disposed about the periphery of said drum in radially spaced relation to said drum and cooperating therewith to form said gap, means to move said plastic film directly over the metallic surface of said drum and through said gap, and means connected across said pair of electrode means for producing an alternating, radio frequency, electric field in said gap having an electric intensity above the disruptive electric intensity of the air in said gap.

5. Apparatus for treating non-conductive plastic film to improve the receptivity thereof to adhesives such as printing inks, comprising a non-insulated grounded metallic drum electrode, electrode means spaced radially from said drum electrode and cooperating therewith to provide an ionizing gap therebetween, means to move said plastic film over said drum and through said gap, and means for producing in said gap an alternating, radio frequency, electric field having a potential gradient greater than the dielectric strength of the air in said gap, said means including a Tesla coil having the secondary thereof connected across the gap between said drum electrode and said electrode means and a spark gap oscillator for energizing the primary of said Tesla coil.

6. In the method of treating a non-conductive plastic body by subjecting a surface thereof to electric stress in a high voltage ionizing gap between spaced apart electrodes to improve the subsequent receptivity of said surface to adhesives such as inks, the steps of applying across said electrodes an alternating radio frequency generating source of sufficiently high voltage to raise the potential gradient in said gap above the disruptive electric intensity of the air in said gap, and passing said plastic body between said electrodes to expose said surface to the alternating, radio frequency, high voltage electric field and to the corona discharge and ozone in said gap incident to the breakdown of the air in said gap.

7. In the method of treating a non-conductive and unprinted plastic film to improve the subsequent receptivity thereof to adhesives such as printing inks, the improvement comprising the steps of passing said plastic film over a rotatable non-insulated grounded metallic drum, and subjecting said film to an alternating radio frequency electric field in a high voltage ionizing gap having said drum as one of the electrodes thereof, the electric field in said gap having a potential gradient greater than the disruptive electric intensity of the air in said gap.

References Cited in the file of this patent

UNITED STATES PATENTS

| | | |
|---|---|---|
| 2,319,174 | Wilson | May 11, 1943 |
| 2,465,093 | Hanson et al. | Mar. 22, 1949 |
| 2,802,085 | Rothacker | Aug. 6, 1957 |
| 2,855,517 | Rainer et al. | Oct. 7, 1958 |
| 2,859,480 | Berthold et al. | Nov. 11, 1958 |
| 2,864,756 | Rothacker | Dec. 16, 1958 |
| 2,882,412 | Cunningham | Apr. 14, 1959 |
| 2,894,139 | Magruder et al. | July 7, 1959 |

Notice of Adverse Decision in Interference

In Interference No. 92,601 involving Patent No. 2,939,956, G. I. Parks, Method and apparatus for treating plastic materials, final decision adverse to the patentee was rendered Apr. 23, 1963, as to claims 1, 2, 3, 4, 5, 6 and 7.

[*Official Gazette July 23, 1963.*]